March 10, 1953 J. J. McGILLIS ET AL 2,631,049
PIPE COUPLING
Filed March 30, 1949

INVENTORS
John J. McGillis
Hugh D. McGillis
BY their Atty.
John H. McKenna

Patented Mar. 10, 1953

2,631,049

UNITED STATES PATENT OFFICE 2,631,049

PIPE COUPLING

John J. McGillis and Hugh D. McGillis, Brockton, Mass.

Application March 30, 1949, Serial No. 84,393

1 Claim. (Cl. 285—122)

This invention relates to improvements in pipe couplings and more particularly to such couplings having provision for relieving any partial-vacuum condition which may have been built up as a result of liquid flow and which tends to induce back-flow or siphoning of liquid when the flow is stopped and the coupling is opened. Such couplings have advantages in fuel oil fill pipes for avoiding spilling of oil when the supply line to a fill pipe is disconnected following a replenishing of an oil storage tank, for example, and the invention is herein disclosed in connection with a fuel oil fill pipe although applicable to liquid-flow systems generally wherein a comparable suction back-flow or siphoning may follow after stoppage of liquid flow.

It is among the objects of the invention to provide a pipe coupling whose parts readily and quickly may be screwed together to effect a sealed connection between two flow conduits and wherein a relatively slight unscrewing of the coupling parts breaks the seal and provides air passages for inflow of air prior to further unscrewing and ultimate separation of the coupling parts.

Another object is to provide a pipe coupling wherein a section of pipe has a coupling member rotatably retained thereon with the coupling member movable axially on the pipe section an appreciable amount, the retaining means including a plurality of washers of which one is resiliently compressible and another is tough and wear resistant, the said coupling member being adapted to screw on another coupling member to effect ultimate clamping of said washers between interior portions of the two members, said resilient member effecting a seal around the pipe section when clamped and opening an air passage past the pipe section when in unclamped condition.

A further object of the invention is to provide a pair of coupling members and a pipe section associated together with an interior sealing washer, the coupling members being relatively operable to effect a clamping of said pipe section and washer with the washer effecting a seal around the pipe section, and being relatively operable to break said seal while the coupling members and pipe section continue in associated relation.

Yet another object is to provide a pair of coupling members and a pipe section associated together with an interior sealing washer, the pipe section having a nozzle part projecting through the washer a substantial distance within both of the coupling members.

It is, moreover, our purpose and object generally to improve coupling structures and more especially couplings having provision for relieving a partial-vacuum condition in a piping system.

Figure 1:
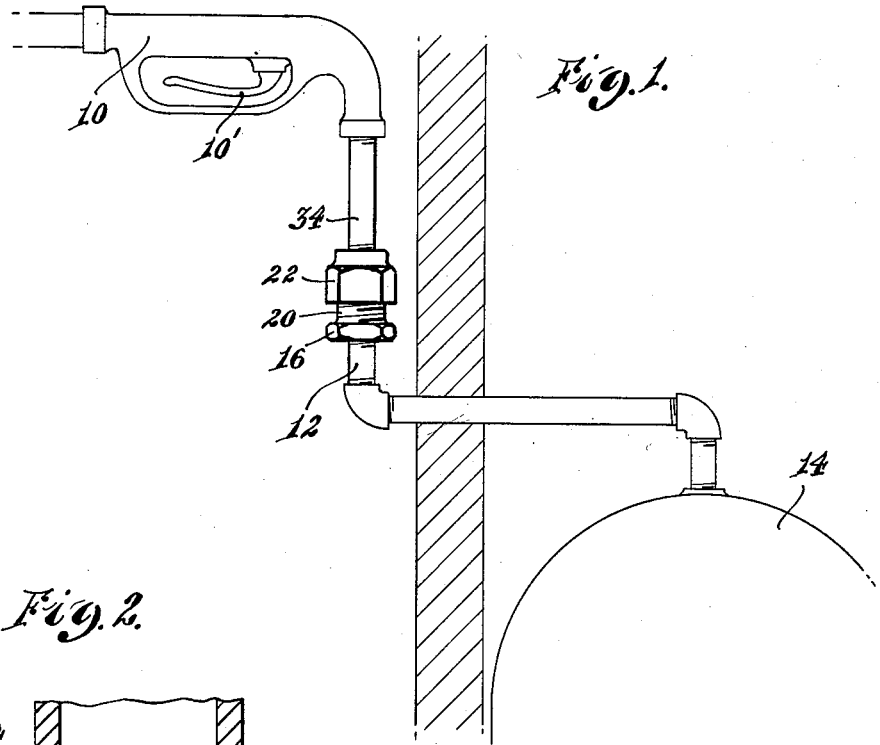
Fig. 1 is a more or less diagrammatic view illustrating the invention as applied to the fill pipe of a domestic oil storage tank.
Figure 2:
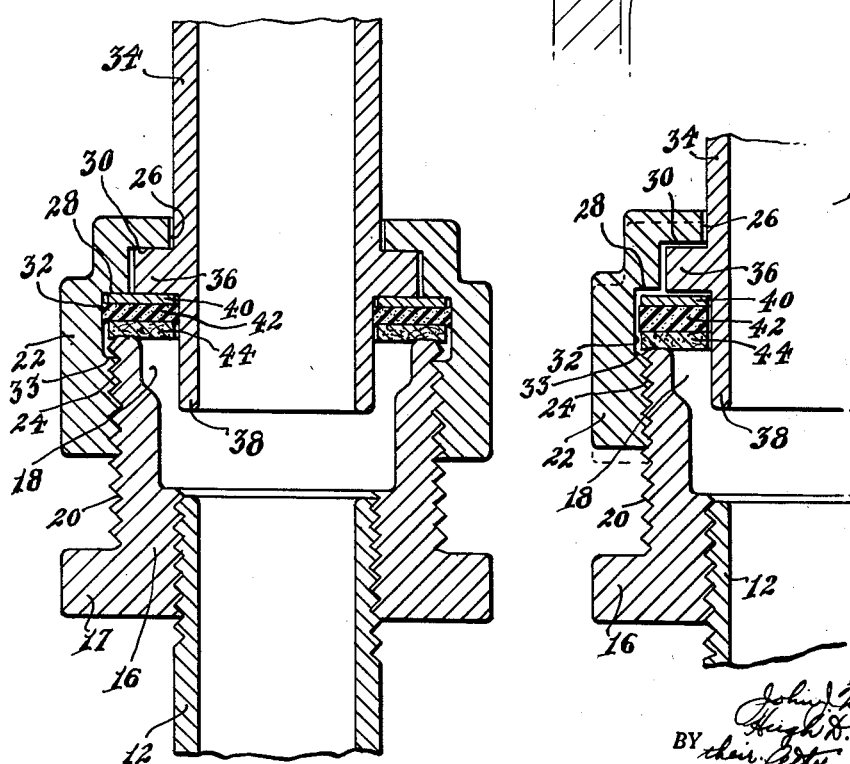
Fig. 2 is a medial cross-sectional view of our improved coupling.

Referring to the drawing, the invention is illustrated as it may be employed for coupling together the oil-delivery nozzle 10 and the fill pipe 12 when the supply of oil in an oil storage tank 14 is to be replenished. It will be obvious, however, that the invention will find utility wherever liquid is to be flowed into a system wherein a partial-vacuum may develop and create a back-flow siphoning of liquid when the supply flow of liquid is cut off.

According to the invention, the usual relatively small fill pipe 12 is provided with an adapter coupling member 16 which screws directly on the end of the fill pipe. Adapter member 16 has a mouth opening 18 substantially larger in diameter than the opening in fill pipe 12, and the walls of the adapter member, around its opening 18, are exteriorly threaded at 20 for reception of the coupling member 22, one end portion of the latter being interiorly threaded at 24 for screwing on member 16.

The end of member 22 opposite the interiorly threaded end has an opening 26 therethrough, and the member 22 is interiorly formed with the annular shoulders 28, 30 and with the larger diameter annular region 32 between the shoulder 28 and the inner end of the threaded portion at 24. A pipe section 34 having diameter approximating the diameter of fill pipe 12 extends loosely through the opening 26 and has the annular enlargement or flange 36 within the member 22 and adapted to seat against the interior shoulder 30. Pipe 34 has substantial extent within coupling member 22 beyond the flange 36 to provide a nozzle 38 which extends a substantial distance axially within the mouth opening 18 of coupling member 16.

Figure 3:
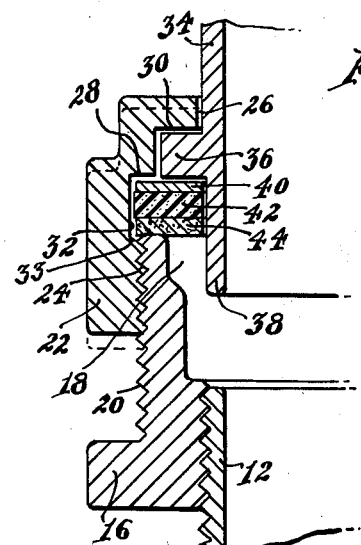
Fig. 3 is a view similar to Fig. 2 but showing one of the coupling members unscrewed a little from the other to provide air inflow passages.

Three superimposed washers 40, 42 and 44 have exterior diameter whereby they may be forced along the threads 24 of member 22 until they reach the larger diameter region 32 in which they become loosely retained by the shoulder 33 on one side and the shoulder 28 at the other side. The washer 40 preferably will be of metal and adapted to seat against shoulder 28. Washer 42 is of resilient compressible material such as neoprene or rubber, for example, and washer 44 preferably is of leather or the like. Washer 42 is arranged between the metal washer 40 and leather washer 44, and the axial holes through all three washers is somewhat larger in diameter than the exterior diameter of the nozzle part 38 of pipe 34, which extends through the washers, so that the washers are loose in annular region 32 when the coupling is not screwed tight. Fig. 3 illustrates the loose condition of the washers when the coupling member 22 is in its full line position on coupling member 16, there being appreciable cracks between the washers and adjacent surfaces through which air may pass into the fill pipe 12 to relieve any partial vacuum therein. However, when coupling member 22 is screwed on member 16 to its dotted position of Fig. 3, the washers 40, 42 and 44 become clamped between the end or lip of member 16 and the interior shoulder 28, the resiliently compressible washer 42 becoming compressed and squeezed into radial sealing engagement with the wall of annular region 32 and the exterior of nozzle part 38 of pipe 34, thereby to effectively seal the coupling against escape of liquid at times of pressure flow through the coupling, such as when the valve 10' at nozzle 10 is manually held open for delivery of oil from a truck to the storage tank 14.

It will be obvious that, upon closing of the nozzle valve 10', a substantial amount of oil will be retained in the pipes between nozzle 10 and tank 14, held against flow into tank 14 by the greater pressure of air in the tank above the oil therein as compared with the partial vacuum condition created in pipe section 34 as a result of the sudden closing of the nozzle valve 10'. Hence, if the coupling were to be broken without first causing the oil trapped in the pipes to flow or drain into tank 14, oil would spill out in substantial amount at the broken coupling.

Actually, the washers 40, 42 and 44 constitute valve means within coupling member 22 for selectively closing and opening the interior of the coupling member to atmosphere, in response to rotations of the coupling member 22.

According to the invention, the initial two or three unscrewing turns of coupling member 22 relieves the washers 40, 42, 44 of clamping pressure so that they become loose in the annular portion 32, and the resilient washer 42 contracts radially to break the seal which is maintained in its compressed condition. As a result, air is permitted to enter around the pipe 34, its flange 36 and nozzle part 38 to relieve the partial vacuum condition whereby the trapped oil can drain into tank 14. However, the nozzle part 38 of pipe 34 continues to project a substantial distance within the mouth opening 18 of coupling member 16, acting to direct the draining oil well into mouth opening 18 with little or no chance of oil finding its way into the opened air-inflow passages. As a result, the danger of out-spilling of oil when opening or breaking the coupling is effectively avoided by an inexpensive and effective coupling structure which is substantially automatic in its relief of the partial vacuum in the system in response to the first two or three unscrewing turns of member 22. Even though no appreciable pause ensues after the first two or three unscrewing turns, the trapped oil ordinarily will have drained away before the member 22 can be separated from member 16.

The tough leather washer 44 takes and withstands the more destructive forces incident to making and breaking the coupling, and all of the washers are conveniently retained relatively deeply within coupling member 22, yet the washers may be readily removed with a sharp tool whenever it may be desired to replace a worn washer 42 or 44 with a new one.

Adapter coupling member 16 preferably will be left on the end of the fill pipe 12, with any suitable removable cover therefor.

It is intended that the patent shall cover, by suitable expression in the appended claim, whatever features of patentable novelty exist in the invention disclosed.

We claim as our invention:

In a liquid-flow conduit coupling, a first conduit member having an annular enlargement thereon spaced substantially from one end of the conduit member, a coupling member rotatably mounted on said first conduit member and having an annular portion for engaging one side of said enlargement on said first conduit member, means within the coupling member defining an annular recess therein having oppositely disposed generally parallel and spaced side walls, and valve means loosely retained within said recess between said generally parallel side walls of the recess and in position to engage the other side of said enlargement on said first conduit member and coacting with said enlargement to limit axial movement of the coupling member on said first conduit member in one direction while said annular portion of the coupling member coacts with said enlargement to limit movement of the coupling member on said first conduit member in the opposite direction, said valve means comprising three superimposed washers of which the middle one is a relatively thick washer of elastic material adapted to resiliently expand radially when compressed between the other washers, all of said washers when free of compression providing air venting passages past said valve means and said middle washer being adapted to close said air venting passages when said washers are subjected to compression, and a second conduit member threadedly engaging said coupling member and adapted to enter said coupling member and compress said washers against one of said side walls of the annular recess when said coupling member is screwed tight on said second conduit member.

JOHN J. McGILLIS.
HUGH D. McGILLIS.

REFERENCES CITED

The following references are of record in the file of this patent:

UNITED STATES PATENTS

| Number | Name | Date |
|---|---|---|
| 282,312 | Hardy | July 31, 1883 |
| 634,344 | Henning | Oct. 3, 1899 |
| 1,116,609 | Mueller | Nov. 10, 1914 |
| 1,815,046 | Burr et al. | July 21, 1931 |
| 1,869,915 | Sample | Aug. 2, 1932 |
| 2,343,774 | Jkeub | Mar. 7, 1944 |
| 2,354,538 | Parker | July 25, 1944 |
| 2,459,608 | Wolfram | Jan. 18, 1949 |
| 2,544,119 | Wolfe | Mar. 6, 1951 |

FOREIGN PATENTS

| Number | Country | Date |
|---|---|---|
| 141,050 | Great Britain | June 30, 1921 |